United States Patent
North et al.

(10) Patent No.: US 12,148,224 B2
(45) Date of Patent: Nov. 19, 2024

(54) SYSTEM AND METHOD FOR VEHICLE-BASED LOCALIZING OF OFFBOARD FEATURES

(71) Applicant: Transportation IP Holdings, LLC, Norwalk, CT (US)

(72) Inventors: Nathan Thomas North, Seattle, WA (US); Ankit Mathur, Bengaluru (IN)

(73) Assignee: Transportation IP Holdings, LLC, Norwalk, CT (US)

(*) Notice: Subject to any disclaimer, the term of this patent is extended or adjusted under 35 U.S.C. 154(b) by 411 days.

(21) Appl. No.: 17/494,492

(22) Filed: Oct. 5, 2021

(65) Prior Publication Data
US 2023/0109164 A1 Apr. 6, 2023

(51) Int. Cl.
*G06V 20/58* (2022.01)
*G06F 18/22* (2023.01)
(Continued)

(52) U.S. Cl.
CPC ............ *G06V 20/582* (2022.01); *G06F 18/22* (2023.01); *G06T 5/50* (2013.01); *G06T 7/11* (2017.01); *G06T 7/74* (2017.01); *G06V 10/25* (2022.01); *G06V 10/758* (2022.01); *G06T 2207/30252* (2013.01); *G06V 2201/07* (2022.01)

(58) Field of Classification Search
CPC .... G06V 20/582; G06V 10/25; G06V 10/758; G06V 2201/07; G06V 10/757; G06V 20/58; G06V 20/588; G06F 18/22; G06T 5/50; G06T 7/11; G06T 7/74; G06T 2207/30252; G06T 7/70; G06T 7/246;
(Continued)

(56) References Cited

U.S. PATENT DOCUMENTS

| | | | |
|---|---|---|---|
| 2015/0249807 A1* | 9/2015 | Naylor | G08B 13/19682 348/155 |
| 2019/0096069 A1* | 3/2019 | Qian | B64C 39/024 |

(Continued)

FOREIGN PATENT DOCUMENTS

WO 2020071619 A1 4/2020

OTHER PUBLICATIONS

Oliver Heirich, "Bayesian Train Localization with Particle Filter, Loosely Coupled CNSS, IMU, and a Track Map", Journal of Sensors (Mar. 2016) (16 pages).

(Continued)

*Primary Examiner* — Manav Seth
(74) *Attorney, Agent, or Firm* — K&L Gates LLP (57) ABSTRACT

A controller obtains plural images generated by an imaging device disposed onboard a vehicle, and analyzes at least first and second images of the plural images to identify a feature of interest that is offboard the vehicle and at least partially depicted in the first and second images. The controller determines a first unit vector for the feature of interest based on a first location of the feature of interest in the first image, and determines a second unit vector for the feature of interest based on a second location of the feature of interest in the second image. The controller calculates a third location of the feature of interest, relative to a physical environment, based on the first unit vector, the second unit vector, and at least one of a first reference location of the vehicle or a second reference location of the vehicle.

18 Claims, 4 Drawing Sheets

(51) Int. Cl.
   *G06T 5/50*    (2006.01)
   *G06T 7/11*    (2017.01)
   *G06T 7/73*    (2017.01)
   *G06V 10/25*   (2022.01)
   *G06V 10/75*   (2022.01)

(58) Field of Classification Search
   CPC .......... G06T 2207/30256; G01C 11/30; G01C 21/005; G01C 21/30; G01C 21/367
   See application file for complete search history.

(56) References Cited

U.S. PATENT DOCUMENTS

| | | | | |
|---|---|---|---|---|
| 2019/0271550 A1* | 9/2019 | Breed | ................... | F21S 41/13 |
| 2020/0098135 A1* | 3/2020 | Ganjineh | .............. | G06F 16/587 |
| 2022/0139212 A1* | 5/2022 | Vig | ..................... | G06V 20/584 |
| | | | | 701/532 |
| 2022/0383545 A1* | 12/2022 | Wachtel | .............. | G01C 21/005 |

OTHER PUBLICATIONS

Johannes Traa, "Least-Squares Intersection of Lines", UIUC 2013 (8 pages).

Extended European Search Report for related EP Patent App. No. 22196288.9 dated Feb. 23, 2023 (7 pages).

* cited by examiner

SYSTEM AND METHOD FOR VEHICLE-BASED LOCALIZING OF OFFBOARD FEATURES

BACKGROUND

Technical Field

The subject matter described herein relates to systems and methods that determine locations of objects offboard of vehicles.

Discussion of Art

Some vehicle control systems utilize digital maps to assist with controlling movement of vehicle systems along routes. Some maps include the locations and identities of static (e.g., stationary or non-mobile), offboard features in the environment, such as infrastructure equipment, mile post markers, and the like. The map can be a digital file used to verify the location of the vehicle system, such as to check the accuracy of global navigation satellite system (GNSS) positioning system-based locations or as a location-determining mechanism when GNSS is not available. The mapped features can be used as indicators of different segments of the route with different speed restrictions, noise restrictions, and the like. In one example, the map of offboard features can be used by a control system, such as a positive train control system (PTC), that is designed to seize control of a vehicle system, and typically stop the vehicle system, in response to determining that the vehicle system is operating in an unsafe manner, such as exceeding a designated speed limit.

Occasionally, the actual physical features in the environment may change such that the map deviates from the physical environment. For example, an offboard feature depicted in the map may be moved to a different location, removed, or knocked over, without updating the map. Also, new physical features may be installed without identifying the features in the map, and the health or state of repair of the feature may degrade over time. This discrepancy between the physical world and the digital map may be problematic because the vehicle control systems may operate based at least in part on expected locations of the features in the environment according to the map.

To enhance the accuracy of the map for the vehicle systems and keep the map up-to-date with respect to the current locations of the features in the environment, work crews regularly "audit" the map by traveling along the routes, determining the physical locations of the features, and then comparing the observed physical locations with the digital locations of the features in the map. This auditing process may be relatively slow, time-consuming, and inefficient, with high labor costs, and is also inherently susceptible to error due to the human element. As a result, an inaccuracy in the digital map at a given segment of a route can exist for an extended time period before detection, which can negatively impact the control of vehicle systems traveling along that segment. It may be desirable to have a system and method that differs from those that are currently available.

BRIEF DESCRIPTION

In one or more embodiments, a controller is provided that includes one or more processors configured to obtain plural images generated by an imaging device disposed onboard a vehicle, and analyze at least first and second images of the plural images to identify a feature of interest that is offboard the vehicle and at least partially depicted in the first and second images. The controller is configured to determine a first unit vector for the feature of interest based on a first location of the feature of interest in the first image, and to determine a second unit vector for the feature of interest based on a second location of the feature of interest in the second image. The first unit vector represents a first direction from the imaging device to the feature of interest at a first time at which data used to form the first image was generated or output. The second unit vector represents a second direction from the imaging device to the feature of interest at a second time at which data used to form the second image was generated or output. The controller is configured to calculate a third location of the feature of interest, relative to a physical environment, based on the first unit vector, the second unit vector, and at least one of a first reference location of the vehicle at the first time or a second reference location of the vehicle at the second time.

In one or more embodiments, method (e.g., for localizing a feature of interest) is provided. The method includes analyzing at least first and second images of a plurality of images to identify a feature of interest that is offboard a vehicle and at least partially depicted in both of the first and second images. The method includes determining a first unit vector for the feature of interest based on a first location of the feature of interest in the first image and determining a second unit vector for the feature of interest based on a second location of the feature of interest in the second image. The first unit vector represents a first direction from the imaging device to the feature of interest at a first time at which data used to generate the first image was generated or output. The second unit vector represents a second direction from the imaging device to the feature of interest at a second time at which data used to generate the second image was generated or output. The method also includes calculating a third location of the feature of interest, relative to a physical environment, based on the first unit vector, the second unit vector, and at least one of a first reference location of the vehicle at the first time or a second reference location of the vehicle at the second time.

In one or more embodiments, a system is provided that includes a controller having one or more processors. The controller is configured to analyze at least first and second images generated based on optical data created by an imaging device disposed onboard a vehicle that is moving when the imaging device outputs the optical data. The at least first and second images being analyzed to identify a feature of interest that is offboard the vehicle and at least partially depicted in the first and second images. The controller is configured to calculate a relative location of the feature of interest to the vehicle based on a first location of the feature of interest in the first image and a second location of the feature of interest in the second image. The controller is configured to determine an absolute location of the feature of interest, within a physical environment, based on the relative location and a reference location of the vehicle at either a first time at which the imaging device created a first portion of the optical data used to generate the first image or a second time at which the imaging device created a second portion of the optical data used to generate the second image. The controller is configured to compare the absolute location of the feature of interest to an archival location of the feature of interest stored in a map file, and, responsive to the absolute location of the feature of interest being within a designated proximity of the archival location, verify the archival location in the map file.

BRIEF DESCRIPTION OF THE DRAWINGS

The inventive subject matter may be understood from reading the following description of non-limiting embodiments, with reference to the attached drawings, wherein below.

DETAILED DESCRIPTION

One or more embodiments described herein are directed to a system and method for localizing offboard features in the surrounding environment of a route using vehicle-based imaging. The vehicle-based imaging can include hardware on a vehicle that travels along the route, such as an imaging device mounted on the vehicle with a field of view that captures the surrounding environment. The imaging equipment can be pre-existing equipment that is already present on the vehicle (e.g., a camera that is onboard the vehicle for one or more other purposes, such as security, logging information, etc.). Alternatively, the imaging equipment can be added to the vehicle. The imaging equipment can be a single camera, or may be two or more cameras or other optical sensors. The imaging equipment generates optical data as the vehicle travels along the route (e.g., images, videos, infrared data, etc.), such that a given offboard feature is at least partially depicted in multiple images generated by the imaging equipment at different times and at different locations along the route as the vehicle passes the feature. The images represent plural observations of the same feature of interest (e.g., the offboard feature).

As described herein, the system and method utilize the plural observations to calculate the relative location of the feature of interest to the vehicle (or the vehicle to the feature of interest). The relative location can include the distance and direction between the vehicle and the feature of interest. The relative location can then be converted to an absolute location of the feature of interest based on a separately determined location of the vehicle while the optical data is created, generated, output, or obtained.

The determined locations and status of offboard features along a route can be used in various applications. One specific use case for such information is auditing a digital map file of the environment that can be used to control the movement of vehicles. The coordinate location of a given feature of interest, as determined by the system and method herein, can be compared to an archived location of the feature in the map file to audit the accuracy of the map file and update the map file where necessary. Compared to the traditional method of auditing the map file using a crew that drives along the route specifically for the auditing task, the auditing described herein is automated and performed while the vehicle travels on a trip, such as to transport passengers and/or cargo.

At least one technical effect of the vehicle-based localization system and method disclosed herein is a relatively accurate determinations of the locations of offboard features of interest. While another effect may be the status or health of the feature. In one embodiment, the location and/or status of the offboard features can be determined using existing hardware onboard a vehicle without requiring a retrofit to add expensive imaging devices. For example, a single imaging device can be used to generate all of the image data. The system may be used to audit a digital map file, enhancing the accuracy of the map file, which can be used to improve control of vehicles that rely on the map file when traveling along the route. Auditing using the automated vehicle-based system and method described herein can obviate the need for a work crew to travel along the route and audit the map file, thus improving resource allocation.

Embodiments of the systems and methods disclosed may do more than automate a process previously performed entirely by a human crew. The system and method determine the locations of offboard features using a vastly different operation than the traditional method that relies on a human crew. For example, the crew would utilize specific instruments to measure the distance from the crew to the feature of interest. The localization system and method described herein may use only one or more generic imaging devices, such as a camera, and may determine distance based on triangulation using multiple observations from different reference locations.

Figure 1:
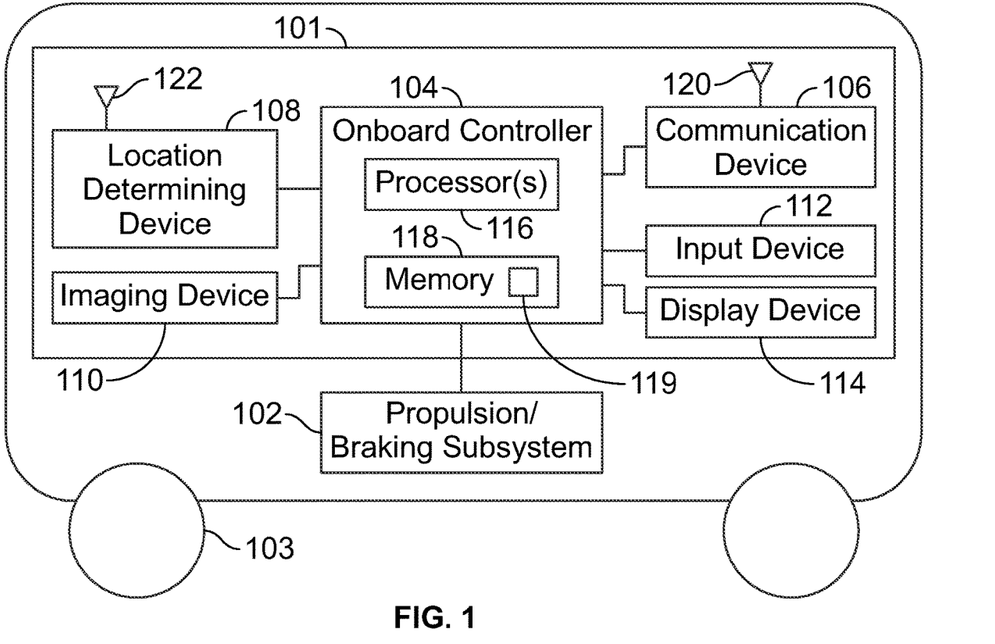
FIG. 1 is a schematic illustration of a localization system onboard a vehicle according to an embodiment.

FIG. 1 is a schematic illustration of a vehicle 100 having a localization system 101 according to an embodiment. The vehicle may include a propulsion and braking subsystem 102 for propelling the vehicle along a route and actively slowing or stopping the vehicle. The localization system may include an onboard controller 104 (or control circuit), a communication device 106, a location determining device 108, an imaging device 110, an input device 112, and a display device 114. The controller may be operably connected to the communication device, the location determining device, the imaging device, the input device, and the display device via wired and/or wireless communication pathways. The controller may be operably connected to the propulsion and braking subsystem of the vehicle.

The onboard controller in this illustrated embodiment is onboard (unless specified otherwise, both onboard and offboard controllers may be referred to herein as controller) performs at least some of the operations described herein to determine the locations of offboard features and audit a digital map file of the environment. The controller represents hardware circuitry that includes and/or is connected with one or more processors 116 (e.g., one or more microprocessors, integrated circuits, microcontrollers, field programmable gate arrays, etc.). The controller includes and/or is connected with a tangible and non-transitory computer-readable storage medium (e.g., memory) 118. The memory may be disposed onboard the vehicle. The memory may store programmed instructions (e.g., software) that is executed by the one or more processors to perform the operations of the controller described herein. The memory additionally or alternatively may store different information, such as image data generated by the imaging device, a digital map file 119 of the surrounding environment, a route database, a trip schedule, a vehicle makeup or manifest, and/or the like.

The map file includes identities of offboard features, such as wayside assets, in the surrounding environment near the route and archival locations of the features. The features are static (e.g., stationary), unless the features are actively being installed, moved, or removed. Suitable features of interest may include one or more of infrastructure, infrastructure equipment, mile post markers, beacons, landmarks, signage, derail devices, wayside equipment, navigation hazards, and/or the like. The infrastructure equipment can include route signal devices, powerlines, catenary lines, communication towers, and track switches. The infrastructure can include route crossings, intersections, bridges, overpasses, buildings, water towers, tunnels, hill crests, and the like. Suitable features may be permanent, semi-permanent, or transitory features. Suitable navigation hazards may include waterfalls, rockslides, lakes, rivers, islands, washed out areas, and the like. Suitable signage may include standard signs found near routes (rail, automotive, marine, and other routes) as well as special purpose signs. A special purpose sign may be used with a barcode, for example, that contains information that allows for calibration of the controller. The special purpose sign may be a static sign configured to indicate a precisely known location to the controller and can thus help the controller calibrate the image analytics. As an example, a dynamically-generated 3D barcode may supply information to the controller regarding the vehicle speed, the distance from the sign to the camera, environmental conditions, and the like. If the special purpose sign is fitted with a communication device and memory, the controller may relay route and feature information to the special purpose sign so that it can in turn relay that information to subsequently passing vehicles.

A suitable map file may be a database of features of interest with associated archival locations for those features. The archival location for each corresponding feature of interest represents the last-known location of that feature in the environment. The archival locations may be represented by coordinates in a coordinate system. In one embodiment, the coordinate system may use GPS coordinates while in another embodiment there may be vector or inertial location systems. As an example, each archival location may be characterized by a longitude component, a latitude component, and optionally an altitude component. In one embodiment, a suitable map may be dynamically created using a sensor and communication network.

In an embodiment, the map file may be utilized by one or more control systems that control movement of vehicles along the routes. A suitable control system may be a positive vehicle control (PVC) system, such as I-ETMS from Wabtec Corporation. A positive vehicle control system is one in which a vehicle is only allowed to move, and/or is allowed to move outside a designated restricted manner (such as above a designated penalty speed limit), responsive to receipt or continued receipt of one or more signals (e.g., received from off-board the vehicle) that meet designated criteria. Examples of such designated criteria are those having a designated characteristic (e.g., a designated waveform and/or content) and/or are received at designated times (or according to other designated time criteria) and/or under designated conditions. This is opposed to 'negative' vehicle control (NVC) systems where a vehicle is allowed to move unless a signal (restricting movement) is received. Optionally, the map file may be used by an NVC system to control movement of vehicles along the routes. The features of interest may be utilized by the PVC and/or NVC systems onboard the vehicles to determine which rules or restrictions are active to govern the movement of a vehicle along the route. For example, depending on where the vehicle is located relative to the features of interest, the upper permitted speed limit of the vehicle may change. Another suitable map file may be one used for route features. An example of such a map is a track database for TRIP OPTIMIZER System from Wabtec Corporation. Trip Optimizer system is an autopilot for rail vehicles and uses a track database map having a three dimensional representation of the track features. Other examples involve autonomous vehicle for on-road and off-road use, as well as marine vessels and aircraft.

The communication device represents hardware circuitry that can wirelessly communicate electrical signals. For example, the communication device can represent transceiving circuitry, one or more antennas 120, and the like. The transceiving circuitry may include a transceiver or a separate transmitter and receiver. The electrical signals can form data packets that in the aggregate represent messages. In an embodiment, the communication device is a radio that wirelessly communicates the electrical signals as radio frequency (RF) signals. The communication device can transmit or broadcast messages that are generated by the controller. The communication device may receive messages and forward to the controller for analysis of the received messages.

The location determining device may determine the respective location of the vehicle at a given time. The location determining device can include a receiver, at least one antenna 122, and associated circuitry. The location determining device may receive signals from satellites. A suitable location determining device may be a GNSS receiver (e.g., a global positioning system (GPS) receiver) that generates data indicative of a location (e.g., a three-dimensional positional coordinate) for the vehicle within a global coordinate system based on signals received from satellites. In an alternative embodiment, the location determining device can determine the respective location based on other mechanisms, such as using signals received from wayside devices, by tracking the direction and distance traveled from a checkpoint location that has determined or assigned coordinates, from a dead reckoning system, or the like.

The imaging device has a field of view that captures or includes at least part of the physical environment outside of the vehicle. For example, the imaging device may be mounted to the vehicle at a front of the vehicle, according to a direction of travel, and oriented forward to view the upcoming segment of the route traveled by the vehicle. The imaging device may be mounted to a roof, a hood, a front panel, a windshield, or a side panel of the vehicle at or near the front of the vehicle. Alternatively, the imaging device may be mounted at another location, such as inside a cab of the vehicle or underneath a chassis of the vehicle. Optionally, the system may utilize multiple imaging devices mounted at different locations onboard the vehicle and both oriented with respective fields of view to capture at least part of the physical environment outside of the vehicle.

The imaging device is an optical sensor that generates optical data of the environment within the field of view. The optical data is referred to herein as image data. The image data can be used to generate images and/or videos in one or more wavelength ranges, such as the visible range, infrared, ultraviolet, and the like. The image data may be stored in the onboard memory for analysis by the onboard controller and/or remotely communicated via the communication device for analysis by an offboard controller (e.g., control circuit). The imaging device may be a camera, such as a video camera that generates image data at a designated or selected frame rate that indicates the number of individual images generated per second. The camera generates image data in the visible wavelength range, and optionally may generate image data in the ultraviolet range and/or infrared range. The image data is transmitted as signals to the controller for analysis of the image data and/or packing the image data into one or more messages to be remotely communicated to an offboard device.

In an embodiment, the localization system and method only uses a single imaging device to determine the location of static offboard features. The single imaging device is a camera in at least one embodiment, but may be another type of imaging device in another embodiment, such as a radar or LiDAR device. The imaging device generates image data while the vehicle moves relative to the static offboard features, which approximates stereo vision using only the single device (e.g., referred to as single camera stereo-approximation (SCSA)). According to other embodiments, the system may utilize multiple imaging devices in tandem to provide actual stereo vision. The downside of using plural imaging devices is the increased hardware and installation costs, and potential increased complexity of calibrating and analyzing image data generated by different devices.

The input device can represent or include an onboard instrument panel, hand brake, steering wheel, throttle lever, throttle and/or brake pedal, computer, tablet computer, hand-held computer, keyboard, touchpad, joystick, and/or the like for enabling a human operator to interact with the onboard controller and control operations of the vehicle.

The display device can be an integrated display screen onboard the vehicle and/or a display screen on a personal, tablet, handheld (e.g., smartphone), or wearable (e.g., smart-watch) computer. The display device is configured to display visual information to a human operator concerning the movement of the vehicle. The controller may utilize the display device to provide a recommended course of operation or control strategy to the human operator, which the operator can select using the input device. Optionally, the controller may display a notification message on the display device that indicates that the controller has detected an inconsistency in the digital map with respect to the locations of offboard features.

The propulsion and braking subsystem of the vehicle represents the hardware components and any associated software used to provide work for propelling and slowing the vehicle along the route. A suitable propulsion system can include one or more traction motors, inverters, combustion engines, battery systems, air brake systems, friction brake systems, dynamic or regenerative brake systems (e.g., using motors), and/or the like. In the illustrated embodiment, the propulsion is provided by exerting a torque on wheels 103 of the vehicle to rotate the wheels relative to the route.

The vehicle in FIG. 1 is a discrete vehicle that is not physically connected to any other vehicles during operation. In other embodiments, other vehicles may be mechanically coupled to one or more other vehicles, such as one or more trailers, non-propulsion-generating rail cars, and the like, to form a vehicle system. In such an embodiment, the components of a localization system, such as shown in FIG. 1, may be distributed among plural vehicles of the vehicle system. Even if the vehicle is not mechanically connected to any other vehicle, the vehicle may still communicate with at least another vehicle to coordinate movements so that the vehicles move together as a vehicle system (e.g., in a convoy). As used, the term convoy here is functionally interchangeable with other like terms, such as consist, swarm, platoon, fleet, train and other vehicle groupings used in various end use applications.

In one embodiment, the vehicle is a rail vehicle and is part of a vehicle group that forms a train that travels on railroad tracks. The tracks represent the route on which the vehicle travels. The vehicle may be a locomotive. Although not shown, the vehicle may be configured to be coupled to one or more other rail vehicles, such as non-propulsion-generating rail cars that carry cargo and/or passengers. In one embodiment, the vehicle may be designed to travel on a road or path. For example, the vehicle may be a truck. Suitable trucks may include a highway capable semi-truck, mining truck, logging truck, or the like. The vehicle in other examples may include one or more other types of vehicles such as automobiles, aircraft, buses, agricultural vehicles, marine vessels, mining vehicles, and/or other off-highway vehicles (e.g., vehicles that are not legally permitted and/or are not designed for travel on public roadways).

In one or more embodiments, the controller receives and analyzes the image data that is generated by the imaging device. The controller performs a localization algorithm, as described herein, to identify and determine the location of one or more features of interest depicted in the image data. The features of interest are offboard the vehicle within the surrounding environment, and are static (e.g., stationary, non-moving). The output of the localization algorithm (e.g., the identities and locations of offboard features of interest) can be used to audit the digital map. In a first embodiment, the onboard controller itself audits the digital map by accessing the digital map from the onboard memory and comparing the locations of the features determined via the localization procedure to archival locations for the corresponding features stored in the map. Optionally, the onboard controller may have a program application or module specifically designed to perform this audit function. For example, the software component referred to as "Track Verify" by Wabtec Corporation may perform the comparison to determine if each feature passes or fails a validation test.

In an embodiment, a feature passes the validation test if the determined location of the feature according to the localization procedure (referred to herein as the observation-based location) is at or within a designated proximity threshold of the location of the corresponding feature as archived in the digital map (referred to herein as the archival location). The feature may fail the validation test if the observation-based location is outside of the designated proximity threshold of the archival location. A feature in the digital file may fail the validation test if there is no observation-based location within the designated proximity threshold of the archival location of that feature, which encompasses the situation of a feature being removed from the surrounding environment.

Related to proximity (i.e., distance) based validation, in one embodiment the mounted camera or sensor may be positioned relative to the feature of interest to replicate the conditions of an earlier data capture event. The controller may position the vehicle appropriately, or cause or indicate how and/or when to orient the vehicle, in one embodiment. As examples, shadows caused the position of the sun may interfere with accuracy of image analysis, an angle of the camera relative to the feature may differ, vegetation may grow (or change seasonally), optical conditions (rain, fog, snow, dust, etc.) in the air may be present or absent, optical conditions (mud, ice, snow, etc.) on the feature of interest may be present, and so on. Accordingly, replicating the conditions of the image capture, adjusting for differences in the data capture, and creating a library of captured images under differing conditions may be performed in some embodiments.

Figure 2:
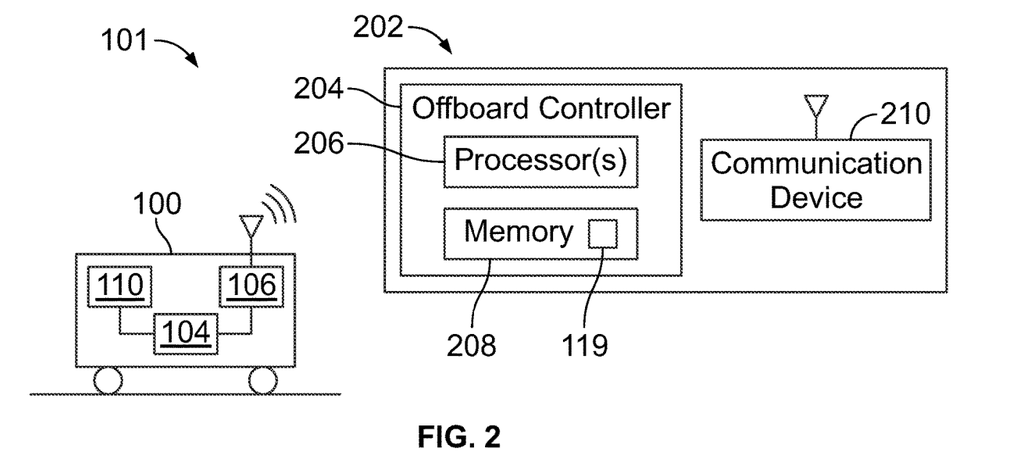
FIG. 2 illustrates the localization system according to an embodiment in which the localization system is distributed among the vehicle and an offboard entity.

In another embodiment, the controller performs the localization algorithm to generate the feature identities and observation-based locations, similar to the first embodiment, but does not audit the digital map. FIG. 2 illustrates a localization system according to an embodiment in which the localization system is distributed among the vehicle and an offboard entity 202. The vehicle communicates with the offboard entity. The localization system in FIG. 2 includes components onboard the vehicle, such as the onboard controller 104, the imaging device 110, and the communication device 106, as well as components of the offboard entity 202. The offboard entity may be a computer, server, workstation, or the like that is offboard the vehicle. The offboard entity may be located at a dispatch facility or at a data storage center. In FIG. 2, the offboard entity includes an offboard controller 204 that includes one or more processors 206, and includes and/or is connected with a tangible and non-transitory computer-readable storage medium (e.g., memory) 208. The offboard entity also includes a communication device 210, which may have similar components as the communication device 106 of the vehicle. In the illustrated embodiment, the digital map 119 is stored on the memory of the offboard entity, and is accessible by the processor(s) of the offboard controller.

In the second embodiment, the onboard controller may package the output of the localization algorithm into one or more messages that are remotely communicated to the offboard controller. For example, the communication device of the vehicle may wirelessly transmit the messages to the communication device of the offboard entity. The one or more messages may include a list of features of interest, with each entry in the list including an identity of the feature and the observation-based location of the feature. Upon receipt of the one or more messages, the offboard controller analyzes the data (e.g., the list), and performs the audit by comparing the received data to the archival locations of the features in the digital map.

In another embodiment, the offboard controller may perform both the localization algorithm and the audit of the digital map. For example, the communication device of the vehicle may communicate the image data generated by the imaging device to the offboard entity. The offboard controller analyzes the image data and performs the localization algorithm on the image data, and then audit the map.

Figure 3:
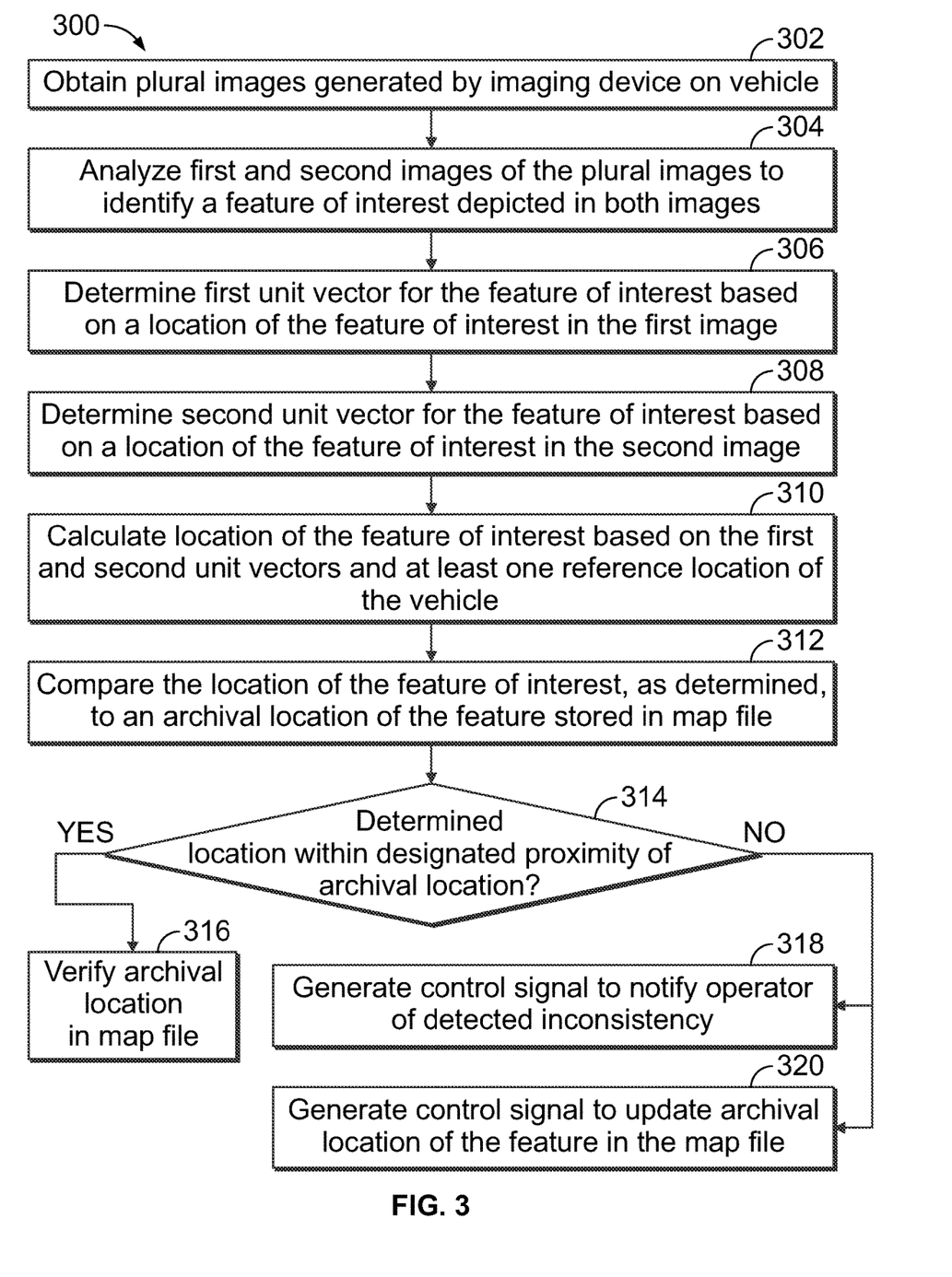
FIG. 3 is a flow chart of a method for localizing offboard features according to an embodiment.

FIG. 3 is a flow chart of a method 300 for localizing offboard features according to an embodiment. The method outlines the localization algorithm that can be used by the localization system to determine the location of offboard features of interest, as well as to audit the map file 119. One or more operations or steps of the method may be performed by the onboard controller of the vehicle and/or the offboard controller of the offboard entity, as shown in FIG. 2. The method may include more steps, fewer steps, and/or different steps than shown in FIG. 3.

At step 302, plural images generated by an imaging device (e.g., imaging device 110) mounted on a vehicle are obtained. In an embodiment, the images are generated by the same imaging device while the vehicle is moving such that the imaging device generates the images from different locations. The imaging device may have a fixed field of view on the vehicle. The images may be generated in relatively quick succession. In some embodiments, the duration between images may be no more than 20 seconds. In other embodiments, the duration may be in a range of from about 20 seconds to about 10 seconds, or in a range of from about 9 seconds to about 5 seconds. In one embodiment, the duration between images may be much less than 5 seconds apart. For example, if the imaging device is a camera that generates images at a rate of 25 frames per second, 125 frames are generated in as little as 5 seconds. The vehicle may travel in a generally linear trajectory during the image data generation process. Thus, it may be assumed that the direction of movement of the vehicle and the orientation of the imaging device are about constant for each of the images generated.

If the route is not straight during the image data acquisition, a calculation may be performed to determine the change in position of the imaging device from a first location where data used to generate the first image is captured or created to a second location where data used to generate the second image is captured or created. The calculation may involve comparing location data of the vehicle at the first location and the second location. The images may be obtained at the controller by receiving the images directly from the imaging device, accessing the images from a local memory device, or receiving the images in a message from a remote source.

Figure 4:
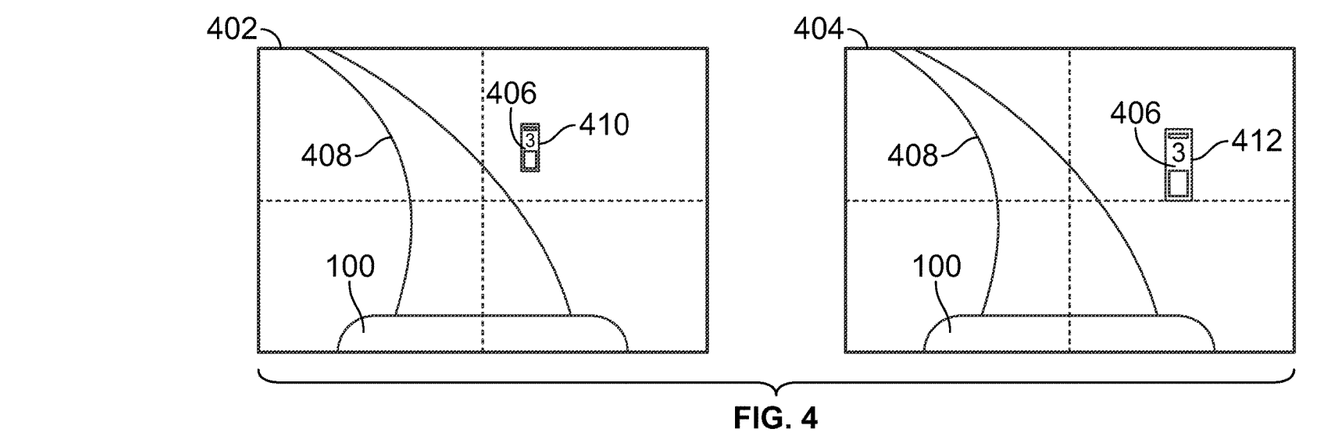
FIG. 4 illustrates a first image and a second image generated by a common imaging device mounted onboard a vehicle according to an embodiment.

At step 304, at least a first image and a second image of the plural images obtained are analyzed to identify a feature of interest that is offboard the vehicle in a surrounding environment and depicted in both images. FIG. 4 illustrates the first image and the second image generated by a common imaging device mounted onboard a vehicle according to an embodiment. Both images are shown to depict a feature of interest 406 and an upcoming segment of a route 408 traversed by the vehicle. The first image is generated prior to the second image. The imaging device and vehicle are closer to the feature of interest in the second image, so the feature of interest in the second image is larger than the feature of interest in the first image. In the illustrated embodiment, the feature of interest is a mile post marker that is mounted on the ground near the route. Although two images are analyzed in FIG. 4, the localization system may analyze more than two images. For example, the localization system may utilize more than two images when there is sufficient computer processing budget and time in an effort to increase the accuracy of the determined location of the feature of interest.

In an embodiment, the feature of interest is identified using machine vision and trained object detection. For example, the controller may include a neural network that is trained via labeled training images to detect specific features of interest present in images. The controller may be trained to detect specific features of interest that are included within a map file, such as infrastructure equipment (e.g., high stand signal lights, cantilever signals, signal bridges, track switches, grade crossings, etc.), mile post markers, derail devices, beacons, landmarks, signs, and/or the like. The controller may be trained to detect specific shapes, colors, and/or color contrasts that would indicate the presence of one of the specific features of interest.

At step 306 in FIG. 3, a first unit vector for the feature of interest is determined based on a location of the feature of interest in the first image. At step 308, a second unit vector for the feature of interest is determined based on a location of the feature of interest in the second image. The unit vectors may be determined by determining a single coordinate position of the feature of interest in each of the first and second images. In a non-limiting example, a first pixel location is selected in the first image to represent the feature of interest, and a second pixel location is selected in the second image to represent the feature of interest. With reference to FIG. 4, the first pixel location is selected by generated a bounding box 410 to enclose the feature of interest in the first image. The size and location of the bounding box on the first image may be based on an image analysis technique, such as edge detection, to determine the perimeter of the feature of interest. Once the bounding box is in place, a reference point of the bounding box is calculated, and the first pixel location is selected as the calculated reference point. In an embodiment, the reference point is the centroid (e.g., center of the area) of the bounding box, such that the first pixel location is selected as the centroid of the bounding box. Alternatively, the reference point may be a corner (e.g., top left, bottom left, etc.), or the like. Similarly, a bounding box 412 is generated on the second image to enclose the feature of interest. The bounding box in the second image is larger than the bounding box in the first image and is offset from the bounding box in the first image due to the movement of the vehicle between the times that the first and second images are generated. The reference point, such as the centroid, of the bounding box in the second image is calculated, and the second pixel location is selected as the reference point of the bounding box in the second image.

Figure 5:
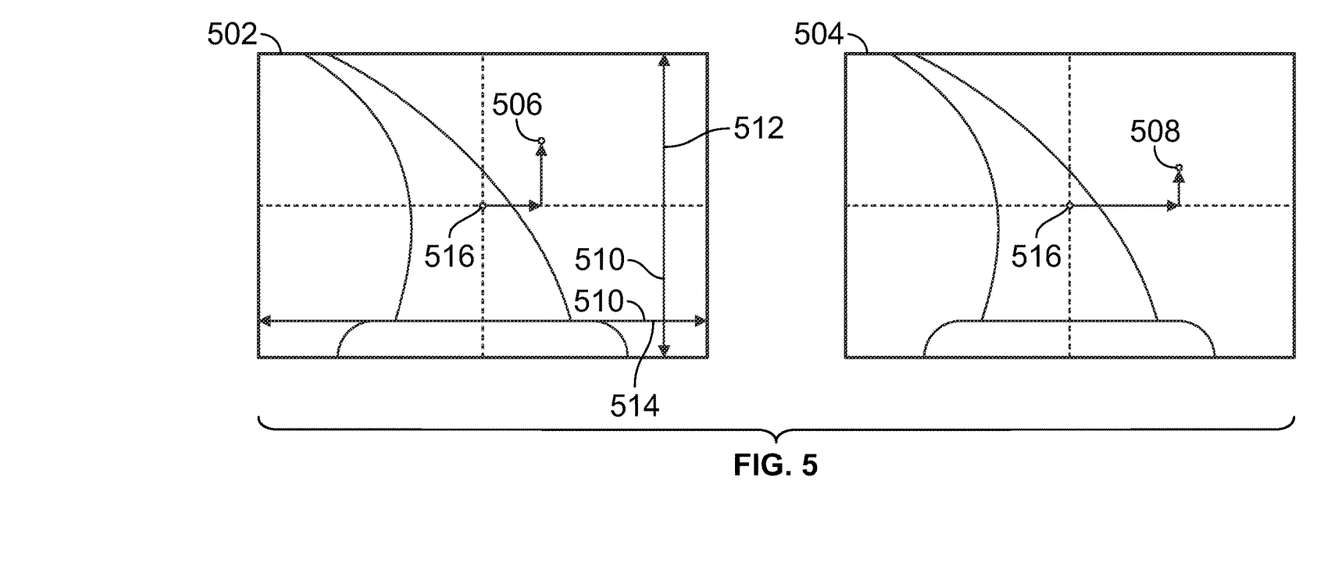
FIG. 5 illustrates a modified first image showing a first pixel location, and illustrates a modified second image showing the second pixel location according to an embodiment.

FIG. 5 illustrates a modified first image 502 showing the first pixel location 506, and illustrates a modified second image 504 showing the second pixel location 508 according to an embodiment. The modified first image differs from the first image in FIG. 4 because the feature of interest is replaced by a point at the first pixel location. The modified second image differs from the second image in FIG. 4 because the feature of interest is replaced by a point at the second pixel location. Optionally, the modified first and second images are not generated, but rather are provided to enhance the description of the localization procedure.

In an embodiment, a coordinate position of the first pixel location is determined relative to the first image. The coordinate position represents a first vector. For example, because the first image is two-dimensional, two coordinates can be determined relative to a frame of reference 510 of the image. The frame of reference includes a vertical or height axis (e.g., y-dimension) 512 and a lateral axis (e.g., x-dimension) 514. The vertical and lateral coordinates of the first pixel location can be determined by counting pixels from a reference point 516 to the first pixel location along both axes. The reference point optionally may be at the center of the first image. The number of pixels in each dimension can be translated to actual distances, such as in millimeters, based on a conversion of pixels to a size of the image sensor of the imaging device. The x and y values of the coordinate position of the second pixel location in the second image may be determined the same way as the first pixel location in the first image. It is noted that the second pixel location is spaced apart from the first pixel location (relative to the image frame of reference). The second pixel location has a greater lateral coordinate than the first pixel location and a smaller vertical coordinate than the first pixel location.

The depth (e.g., z-dimension) of the coordinate positions of the first and second pixel locations representing the feature of interest may be based on a focal length of the imaging device that generated the first and second images. For example, the focal length is a property or characteristic of the imaging device, and indicates the distance between the lens of the imaging device and the image sensor of the imaging device when the depicted objects in the image frame are in focus. A non-limiting example, the focal length may be 25 mm. The focal length, and therefore the depth coordinate, of the first and second pixel locations may be the same.

The first pixel location may be represented by a first vector $v_1$ or $(x_1, y_1, z_1)$, and the second pixel location may be represented by a second vector $v_2$ or $(x_2, y_2, z_2)$. The x components are the lateral coordinates, they components are the vertical coordinates, and the z components are the depth coordinates. The first unit vector is calculated based on the first vector $(x_1, y_1, z_1)$. For example, the magnitude $\|v_1\|$ of the first vector is calculated according to formula (i):

$$\|v_1\| = \sqrt{x_1^2 + y_1^2 + z_1^2} \tag{i}$$

Then, the first unit vector $\widehat{u_1}$ can be calculated by dividing the first vector $v_1$ by the magnitude, as shown in formula (ii):

$$\widehat{u_1} = \frac{v_1}{\|v_1\|} = \left( \frac{x_1}{\sqrt{x_1^2 + y_1^2 + z_1^2}}, \frac{y_1}{\sqrt{x_1^2 + y_1^2 + z_1^2}}, \frac{z_1}{\sqrt{x_1^2 + y_1^2 + z_1^2}} \right) \tag{ii}$$

The unit vector can be converted to degrees by taking the inverse cosign of each component. The first unit vector $\widehat{u_1}$ represents the direction (e.g., first direction) from the imaging device, oriented based on the direction of movement of the vehicle, to the feature of interest at the time (e.g., first time) at which the first image was generated by the imaging device.

The second vector $v_2$ can be converted to a second unit vector $\widehat{u_2}$ according to the same formulas. The second unit vector $\widehat{u_2}$ represents the direction (e.g., second direction) from the imaging device to the feature of interest at the time (e.g., second time) at which the second image was generated by the imaging device.

At step 310 in FIG. 3, a location of the feature of interest in the surrounding environment is calculated based on the first unit vector, the second unit vector, and at least one reference location of the vehicle. The location of the feature of interest in the surrounding environment refers to the physical location of the actual feature, determined based on the analysis of the image data. The location of the feature of interest can be referred to as an observation-based location of the feature, to avoid confusion with the locations of the feature within the first and second images. The at least one reference location of the vehicle may include a first reference location of the vehicle at the first time in which the first image was generated and/or a second reference location of the vehicle at the second time in which the second image was generated. The reference locations of the vehicle may be determined based on location data generated by the location determining device 108 onboard the vehicle, as shown in FIG. 1. The vectors and at least one reference location are used to triangulate the position of the feature of interest.

Figure 6:
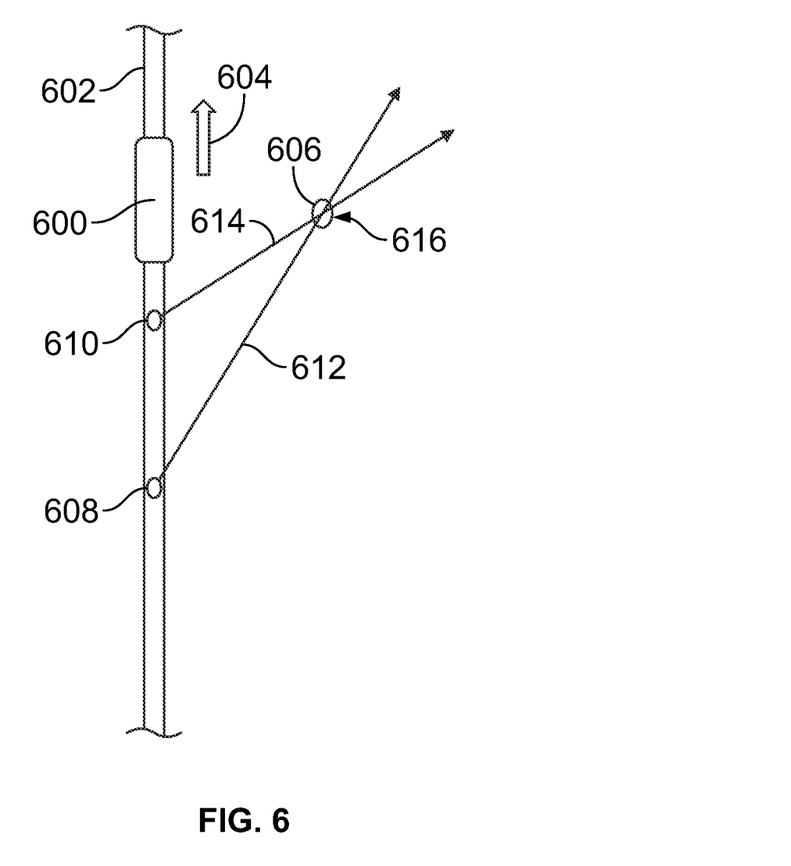
FIG. 6 is a schematic diagram illustrating a vehicle traveling along a route in a direction of travel as the vehicle passes a feature of interest.

FIG. 6 is a schematic diagram illustrating a vehicle 600 traveling along a route 602 in a direction of travel 604 as the vehicle passes a feature of interest 606. A suitable vehicle may be, for example, the vehicle shown in FIGS. 1 and 2 and which may include all or a portion of the localization system described herein. The diagram shows the first reference location 608 and the second reference location 610, at which the first and second images, respectively, were generated by the imaging device onboard the vehicle. A first line 612 extends from the first reference location to the feature of interest. A second line 614 extends from the second reference location to the feature of interest. The direction of the first line is defined by the first unit vector $\widehat{u_1}$. The direction of the second line is defined by the second unit vector $\widehat{u_2}$. Stated differently, the first line has the first unit vector $\widehat{u_1}$ and the second line has the second unit vector $\widehat{u_2}$. The lines are shown in only two dimensions in FIG. 6, although each of the lines may be three-dimensional.

In an embodiment, the observation-based location of the feature of interest is determined by calculating a position of intersection 616 between the first and second lines. The feature of interest is located at the position of intersection between the lines. In a non-limiting example, the position of intersection is calculated using the least squares solution for the intersection of lines. The least squares intersection of lines derives a unique solution point that attempts to minimize the sum of distances from that point to the lines. The least squares intersection of lines can be used to provide the unique solution point even if the lines do not actually intersect in three-dimensions. Furthermore, least squares intersection of lines can accommodate three or more lines. Optionally, the localization procedure described above can be performed on a third image depicting the same feature of interest (and generated by the imaging device at a third time) to calculate a third line that extends along a third unit vector. The least squares intersection of lines can be used to derive the position of intersection between all three lines. The least squares solution for the intersection of lines is described in more detail in Johannes Traa, "Least-Squares Intersection of Lines," UIUC 2013, which is incorporated by reference herein.

The observation-based location of the feature of interest may be a relative location or an absolute location. For example, the position of intersection of the lines may indicate a relative location of the feature that is relative to the vehicle. The first and second reference locations of the vehicle, based on the location-determining device, may be absolute locations such as GPS coordinates. The absolute positional coordinates of the first and/or second reference locations can be used to assign absolute positional coordinates to the observation-based location of the feature because the relative relationship is known. Stated differently, the absolute positional coordinates of two points on two different lines are known, and those coordinates can be used to assign absolute position coordinates to the point at which the two lines actually or constructively intersect. The absolute positional coordinates of the observation-based location of the feature of interest may include at least longitude and latitude components, and optionally also an altitude component.

Once the identity (e.g., type) of feature of interest and the location of the feature of interest in the surrounding environment of the route are determined, that information can be stored in a local memory or remotely communicated as the vehicle continues traveling along the route. During a single trip of the vehicle, the localization system may determine the identity and location for plural features of interest along the side of the route. The data may be aggregated into a list in which each list entry includes an identity (or identifying characteristic) and a corresponding observation-based location for each of the features of interest detected.

In at least one embodiment, the locations of the features of interest are used to audit the map file. The audit may be performed by the onboard controller on the vehicle or by the offboard entity. Referring back to FIG. 3, at step 312 the location of a feature of interest, as determined by the localization system, is compared to an archival location of the feature of interest stored in the map file. The archival location of the feature of interest is the last-known positional coordinates of the feature. At step 314, it is determined whether the observation-based location of the feature of interest is within a designated proximity of the archival location associated with that feature. For example, the designated proximity may be a value in the range between 1 and 1.5 meters. In one embodiment, the designated proximity may be a value in a range of from about 1.5 meters and 2.5 meters, or in a range of from about 2.5 meters to about 4 meters. In the illustrated example, the designated proximity is set at each of 1.8 m, 2 m, and 2.2 m. If the designated proximity is 2 m, and the observation-based location of the feature of interest is within 2 m from the archival location stored in the map file, then flow proceeds to step 316. At step 316, the archival location for the specific feature of interest is verified. The controller performing the audit may make a note in the map file to indicate that the archival location was verified on the specific date of the audit.

If, on the other hand, the observation-based location of the feature of interest is determined to fall outside of the designated proximity threshold relative to the archival location for that feature, then flow proceeds to steps 318 and/or 320. This scenario may occur if a feature has been removed or moved, if the location of the feature was inaccurately measured during a prior localization process, and/or if an error was made when inputting the location coordinates in the map file. At step 318, a control signal is generated to notify an operator of a detected inconsistency between the map file and the latest localization of the offboard features. The control signal may send a text-based message to a computing device utilized by the operator, such as a smartphone, tablet, wearable computing device, or laptop computer. At step 320, a control signal is generated to update the archival location for that specific feature in the map file based on the observation-based location of the feature. For example, the control signal may update the map file by storing the coordinates of the observation-based location of the feature in place of the coordinates of the archival location that are currently stored in the map file. Thus, if the archival location of feature x is stored in the map file as having coordinates of (a, b, c), and it is determined at step 316 that the observation-based location of feature x, with coordinates (l, m, o), is outside of the proximity threshold of the archival location, then the controller may update the map file to substitute coordinates (l, m, o) as the new archival location for feature x.

If the localization procedure identifies a feature of interest that is not within the map file, then the controller may initiate at least one response. The response may be to update the map file, to add a new entry for that feature, to query additional libraries for historical data for that location and/or feature, run additional filters or corrections on the image, and/or to notify an operator or back office system of the discrepancy. The coordinates of the observation-based location of the feature are saved. In one embodiment, they may be saved as the archival location in the map file.

Optionally, the movement of the vehicle may be adjusted or altered based on the determined location of the feature of interest. Once it is determined that the map file is not accurate at step 314 the controller may generate a vehicle control signal. The vehicle control signal may modify the movement of the vehicle. In particular, the controller may modify one or more of the speed, direction, tractive effort, brake effort, and the like of the vehicle. In an example, if the audit of the map file using the localization procedure reveals that a speed limit sign is missing (e.g., it is indicated in the map file but not detected by the localization system), the controller may control the vehicle to slow down (or speed up if necessary). This may allow the vehicle to travel more in a defined manner (e.g., more conservatively) within a permitted speed range. In another example, the localization system may determine the presence of a feature of interest in the form of a detour sign that is not present in the map file. In response to detecting the detour sign, the controller may control the vehicle to deviate from the current route (e.g., track) to take the detour, such as by taking a track switch to enter and travel on another route.

The accuracy of the localization procedure may be enhanced by utilizing more than two observations of the feature of interest. For example, there may be dozens or hundreds of images generated by the imaging device that depict the feature of interest as the vehicle travels along the route an approaches the feature. In the flow chart of FIG. 3, the controller (e.g., one or more processors) may calculate the location of the feature of interest at step 310 based on the first and second images, as described above, and then may return to step 304 to analyze another set of two images depicting the feature of interest. The other set may include the first image and a third image, the second image and the third image, or the third image and a fourth image. The controller may repeat the steps 304 to 310 based on the other set of images to calculate the location of the feature of interest. The controller may perform these operations for plural different sets of two images to generate a multitude of observation-based locations for the same feature of interest, and then may aggregate the data to determine a single set of coordinates for the location of that feature of interest. For example, the controller may calculate the average of the multitude of observation-based locations to generate the final coordinates. Combining the output of multiple calculations using different sets of images can increase the accuracy of the final coordinates, relative to only using a single pair of images to localize the feature.

Optionally, the controller may utilize weighting and/or clustering when aggregating the data. For example, the controller may weight some calculated locations of the feature greater than other calculated locations of the feature based on the time delay (or travel distance of the vehicle) between the generation of the respective set of two images used to calculate the location. In general, the location output based on two images that are proximal in time, with a short delay (e.g., <0.5 sec or <1 sec) between the time that the two images are generated, may be weighted lower than the location output based on two images that have a longer time delay, because the longer time delay enables the imaging device to move more between images, which improves the accuracy of the location calculation. Optionally, the controller may only perform the localization algorithm using images that have a time delay within a designated range. In one embodiment, the designated time delay range for images generated may be no less than 1 second apart. In another embodiment, it may be no more than 4 seconds apart. Clustering can be used to ignore outlier data points. In so using clustering, the outliers may not skew the final location coordinates.

Optionally, if another type of imaging device is available, the data generated by the other imaging device can be compared to the observation-based location of the feature of interest to confirm and/or improve the accuracy of the localization. For example, a distance-determining device, such as a range finder device, can measure the distance to the feature of interest, and that distance measurement can be compared to the coordinates determined by the localization system.

The localization algorithm described with reference to FIG. 3 uses vectors to determine the location of the feature of interest, and then performs automated auditing of the map file. In another embodiment, the location of the feature of interest can be determined based on the relative sizes of the feature of interest in the images that are analyzed and the movement characteristics of the vehicle. For example, using the bounding boxes shown in FIG. 4, the controller can determine the extent of enlargement of the feature of interest from the first image to the subsequent second image along one or more dimensions. The controller can also determine the distance, in number of pixels, between the feature of interest and the route in each of the images to determine the change in distance relative to the image frame. The controller can utilize one of these ratios, the enlargement of the feature or the increased distance from the route to the feature, between the two images with information such as the time delay between the images, the speed of the vehicle, and/or the distance traveled between the generation of the images, to calculate the location of the feature of interest (without using vectors). Although the vector-based algorithm described in FIG. 3 is a method of calculating the location of the offboard feature of interest, the location may be calculated using the changing aspect ratios or other methods in other embodiments.

In the embodiments described herein, the unit vectors represent a direction from the imaging device to the feature of interest at a time at which the image data, which is used to form a respective image, was created, generated, or output by the imaging device. The times at which the images are generated or formed may by delayed relative to the times that the data is generated, without deviating from the embodiments described herein. For example, a vehicle may travel along a route during a trip collecting image data and location data over time, and then after the trip may use the image data to generate or form first and second images and analyze the images as described herein to determine the location of a feature of interest. The image generation, localization procedure, and optional audit may occur at a time that is after the vehicle's trip. Alternatively, the images may be generated soon after the optical characteristics (e.g., light, IR, etc.) are sensed by the imaging device/optical sensor to generate the data, with a slight delay attributable to CPU processing delays.

In an embodiment, a controller includes one or more processors configured to obtain plural images generated by an imaging device disposed onboard a vehicle, and analyze at least first and second images of the plural images to identify a feature of interest that is offboard the vehicle and at least partially depicted in the first and second images. The controller is configured to determine a first unit vector for the feature of interest based on a first location of the feature of interest in the first image, and to determine a second unit vector for the feature of interest based on a second location of the feature of interest in the second image. The first unit vector represents a first direction from the imaging device to the feature of interest at a first time at which data used to form the first image was generated or output. The second unit vector represents a second direction from the imaging device to the feature of interest at a second time at which data used to form the second image was generated or output. The controller is configured to calculate a third location of the feature of interest, relative to a physical environment, based on the first unit vector, the second unit vector, and at least one of a first reference location of the vehicle at the first time or a second reference location of the vehicle at the second time.

Optionally, the controller is further configured to determine the first unit vector by selecting a first pixel location in the first image that represents the feature of interest, and by determining a coordinate position of the first pixel location relative to a frame of reference of the first image and a focal length of the imaging device. The controller may be further configured to select the first pixel location by determining a centroid of the feature of interest depicted in the first image.

Optionally, the controller is further configured to calculate the third location of the feature of interest by calculating a position of intersection between (i) a first line that has the first unit vector and extends through the first reference location and (ii) a second line that has the second unit vector and extends through the second reference location.

Optionally, the controller is further configured to determine the first and second reference locations of the vehicle based at least in part on location data generated by a location determining device disposed onboard the vehicle.

Optionally, the controller is further configured to compare the third location of the feature of interest to an archival location of the feature of interest stored in a map file. Responsive to the third location of the feature of interest being within a designated proximity of the archival location, the controller is further configured to verify the archival location in the map file. Optionally, responsive to the third location of the feature of interest being outside of the designated proximity of the archival location, the controller is further configured to generate a control signal to one or more of notify an operator of a detected inconsistency or update the archival location of the feature of interest in the map file.

Optionally, the feature of interest is one or more of a mile post marker, infrastructure equipment, a derail device, a beacon, a landmark, or a sign. The controller may be further configured to characterize the third location of the feature of interest in at least latitude and longitude coordinates. The controller may be further configured to identify the feature of interest in the first image and the second image using machine vision and trained object recognition.

In one or more embodiments, method includes analyzing at least first and second images of a plurality of images to identify a feature of interest that is offboard a vehicle and at least partially depicted in both of the first and second images. The method includes determining a first unit vector for the feature of interest based on a first location of the feature of interest in the first image and determining a second unit vector for the feature of interest based on a second location of the feature of interest in the second image. The first unit vector represents a first direction from the imaging device to the feature of interest at a first time at which data used to generate the first image was generated or output. The second unit vector represents a second direction from the imaging device to the feature of interest at a second time at which data used to generate the second image was generated or output. The method also includes calculating a third location of the feature of interest, relative to a physical environment, based on the first unit vector, the second unit vector, and at least one of a first reference location of the vehicle at the first time or a second reference location of the vehicle at the second time.

Optionally, determining the first unit vector comprises selecting a first pixel location in the first image that represents the feature of interest, and determining a coordinate position of the first pixel location relative to a frame of reference of the first image and a focal length of the imaging device. The first pixel location may be selected by generating a bounding box to enclose the feature of interest in the first image and determining a centroid of the bounding box.

Optionally, calculating the third location of the feature of interest comprises calculating a position of intersection between a first line defined by the first unit vector and a second line defined by the second unit vector.

Optionally, the method also compares the third location of the feature of interest to an archival location of the feature of interest stored in a map file, and, responsive to the third location of the feature of interest being within a designated proximity of the archival location, verifying the archival location in the map file. Optionally, responsive to the third location of the feature of interest being outside of the designated proximity of the archival location, the method includes generating a control signal to one or more of notify an operator of a detected inconsistency or update the archival location of the feature of interest in the map file.

In one or more embodiments, a system includes a controller having one or more processors. The controller is configured to analyze at least first and second images generated based on optical data created by an imaging device disposed onboard a vehicle that is moving when the imaging device outputs the optical data. The at least first and second images being analyzed to identify a feature of interest that is offboard the vehicle and at least partially depicted in the first and second images. The controller is configured to calculate a relative location of the feature of interest to the vehicle based on a first location of the feature of interest in the first image and a second location of the feature of interest in the second image. The controller is configured to determine an absolute location of the feature of interest, within a physical environment, based on the relative location and a reference location of the vehicle at either a first time at which the imaging device created a first portion of the optical data used to generate the first image or a second time at which the imaging device created a second portion of the optical data used to generate the second image. The controller is configured to compare the absolute location of the feature of interest to an archival location of the feature of interest stored in a map file, and, responsive to the absolute location of the feature of interest being within a designated proximity of the archival location, verify the archival location in the map file.

Optionally, responsive to the absolute location of the feature of interest being outside of the designated proximity of the archival location, the controller is configured to generate a control signal to one or more of notify an operator of a detected inconsistency or update the archival location of the feature of interest in the map file.

Optionally, the controller is configured to calculate the relative location of the feature of interest to the vehicle by determining a first unit vector for the feature of interest based on the first location of the feature of interest in the first image, determining a second unit vector for the feature of interest based on the second location of the feature of interest in the second image, and calculating a position of intersection between a first line that has the first unit vector and a second line that has the second unit vector.

Optionally, the controller is configured to determine the reference location of the vehicle based on location data generated by a location determining device disposed onboard the vehicle.

As used herein, the terms "processor" and "computer," and related terms, e.g., "processing device," "computing device," and "controller" may be not limited to just those integrated circuits referred to in the art as a computer, but refer to a microcontroller, a microcomputer, a programmable logic controller (PLC), field programmable gate array, and application specific integrated circuit, and other programmable circuits. Suitable memory may include, for example, a computer-readable medium. A computer-readable medium may be, for example, a random-access memory (RAM), a computer-readable non-volatile medium, such as a flash memory. The term "non-transitory computer-readable media" represents a tangible computer-based device implemented for short-term and long-term storage of information, such as, computer-readable instructions, data structures, program modules and sub-modules, or other data in any device. Therefore, the methods described herein may be encoded as executable instructions embodied in a tangible, non-transitory, computer-readable medium, including, without limitation, a storage device and/or a memory device. Such instructions, when executed by a processor, cause the processor to perform at least a portion of the methods described herein. As such, the term includes tangible, computer-readable media, including, without limitation, non-transitory computer storage devices, including without limitation, volatile and non-volatile media, and removable and non-removable media such as firmware, physical and virtual storage, CD-ROMS, DVDs, and other digital sources, such as a network or the Internet.

The singular forms "a", "an", and "the" include plural references unless the context clearly dictates otherwise. "Optional" or "optionally" means that the subsequently described event or circumstance may or may not occur, and that the description may include instances where the event occurs and instances where it does not. Approximating language, as used herein throughout the specification and claims, may be applied to modify any quantitative representation that could permissibly vary without resulting in a change in the basic function to which it may be related. Accordingly, a value modified by a term or terms, such as "about," "substantially," and "approximately," may be not to be limited to the precise value specified. In at least some instances, the approximating language may correspond to the precision of an instrument for measuring the value. Here and throughout the specification and claims, range limitations may be combined and/or interchanged, such ranges may be identified and include all the sub-ranges contained therein unless context or language indicates otherwise.

This written description uses examples to disclose the embodiments, including the best mode, and to enable a person of ordinary skill in the art to practice the embodiments, including making and using any devices or systems and performing any incorporated methods. The claims define the patentable scope of the disclosure, and include other examples that occur to those of ordinary skill in the art. Such other examples are intended to be within the scope of the claims if they have structural elements that do not differ from the literal language of the claims, or if they include equivalent structural elements with insubstantial differences from the literal language of the claims.

What is claimed is:

1. A controller, comprising one or more processors configured to:
   obtain plural images generated by an imaging device disposed onboard a vehicle;
   analyze at least first and second images of the plural images to identify a feature of interest that is offboard the vehicle and at least partially depicted in the first and second images;
   generate a first bounding box to enclose the feature of interest identified in the first image;
   generate a second bounding box to enclose the feature of interest identified in the second image;
   determine a first centroid of the first bounding box;
   determine a second centroid of the second bounding box;
   determine a first unit vector for the feature of interest based on a first pixel location of the first centroid in the first image, the first unit vector representing a first direction from the imaging device to the feature of interest at a first time at which data used to form the first image was generated or output;
   determine a second unit vector for the feature of interest based on a second pixel location of the second centroid in the second image, the second unit vector representing a second direction from the imaging device to the feature of interest at a second time at which data used to form the second image was generated or output;
   calculate a physical location of the feature of interest, relative to a physical environment, based on the first unit vector, the second unit vector, and at least one of a first reference location of the vehicle at the first time or a second reference location of the vehicle at the second time, wherein the first and second images represent a first pair of the plural images and the physical location of the feature of interest is a first physical location;
   analyze a second pair of the plural images to identify the feature of interest depicted in each image of the second pair and calculate a second physical location of the feature of interest, relative to the physical environment, based on the feature of interest depicted in the second pair;
   aggregate at least the first physical location and the second physical location to determine a final location of the feature of interest relative to the physical environment; and,
   weight the first physical location greater than the second physical location based on a first time delay between respective times that the first image and the second image in the first pair are generated by the imaging device being greater than a second time delay between times that the images in the second pair are generated by the imaging device.

2. The controller of claim 1, wherein the controller is configured to determine the first pixel location by determining a coordinate position of the first centroid relative to a frame of reference of the first image and a focal length of the imaging device.

3. The controller of claim 1, wherein the controller is configured to calculate the physical location of the feature of interest by calculating a position of intersection between (i) a first line that has the first unit vector and extends through the first reference location and (ii) a second line that has the second unit vector and extends through the second reference location.

4. The controller of claim 1, wherein the controller is further configured to determine the first and second reference locations of the vehicle based at least in part on location data generated by a location determining device disposed onboard the vehicle.

5. The controller of claim 1, wherein the controller is further configured to compare the physical location of the feature of interest to an archival location of the feature of interest stored in a map file, and, responsive to the physical location of the feature of interest being within a designated proximity of the archival location, the controller is further configured to verify the archival location in the map file.

6. The controller of claim 5, wherein, responsive to the physical location of the feature of interest being outside of the designated proximity of the archival location, the controller is configured to generate a control signal to one or more of notify an operator of a detected inconsistency or update the archival location of the feature of interest in the map file.

7. The controller of claim 1, wherein the feature of interest is one or more of a mile post marker, infrastructure equipment, a derail device, a beacon, a landmark, or a sign.

8. The controller of claim 1, wherein the controller is configured to characterize the physical location of the feature of interest in at least latitude and longitude coordinates.

9. The controller of claim 1, wherein the controller is further configured to identify the feature of interest in the first image and the second image using machine vision and trained object recognition.

10. A method, comprising:
analyzing at least first and second images of a plurality of images to identify a feature of interest that is offboard a vehicle and at least partially depicted in both of the first and second images, the plurality of images generated by an imaging device disposed onboard the vehicle;
generating a first bounding box to enclose the feature of interest identified in the first image;
generating a second bounding box to enclose the feature of interest identified in the second image;
determining a first centroid of the first bounding box;
determining a second centroid of the second bounding box;
determining a first unit vector for the feature of interest based on a first pixel location of the first centroid in the first image, the first unit vector representing a first direction from the imaging device to the feature of interest at a first time at which data used to generate the first image was generated or output;
determining a second unit vector for the feature of interest based on a second pixel location of the second centroid in the second image, the second unit vector representing a second direction from the imaging device to the feature of interest at a second time at which data used to generate the second image was generated or output; and
calculating a physical location of the feature of interest, relative to a physical environment, based on the first unit vector, the second unit vector, and at least one of a first reference location of the vehicle at the first time or a second reference location of the vehicle at the second time, wherein the first and second images represent a first pair of the plural images and the physical location of the feature of interest is a first physical location;
analyzing a second pair of the plural images to identify the feature of interest depicted in each image of the second pair and calculate a second physical location of the feature of interest, relative to the physical environment, based on the feature of interest depicted in the second pair;
aggregating at least the first physical location and the second physical location to determine a final location of the feature of interest relative to the physical environment; and,
weighting the first physical location greater than the second physical location based on a first time delay between respective times that the first image and the second image in the first pair are generated by the imaging device being greater than a second time delay between times that the images in the second pair are generated by the imaging device.

11. The method of claim 10, further comprising determining the first pixel location in the first image based on a coordinate position of the first centroid relative to a frame of reference of the first image and a focal length of the imaging device.

12. The method of claim 10, wherein calculating the physical location of the feature of interest comprises calculating a position of intersection between a first line defined by the first unit vector and a second line defined by the second unit vector.

13. The method of claim 10, further comprising:
comparing the physical location of the feature of interest to an archival location of the feature of interest stored in a map file; and
responsive to the physical location of the feature of interest being within a designated proximity of the archival location, verifying the archival location in the map file.

14. The method of claim 13, wherein, responsive to the physical location of the feature of interest being outside of the designated proximity of the archival location, the method includes generating a control signal to one or more of notify an operator of a detected inconsistency or update the archival location of the feature of interest in the map file.

15. A system, comprising:
a controller including one or more processors, the controller configured to:
analyze first and second images generated based on optical data generated by an imaging device disposed onboard a vehicle that is moving when the imaging device generates the optical data, the controller configured to analyze the first and second images to identify a feature of interest that is offboard the vehicle and at least partially depicted in each of the first and second images;
generate a first bounding box to enclose the feature of interest identified in the first image;
generate a second bounding box to enclose the feature of interest identified in the second image;
determine a first centroid of the first bounding box;
determine a second centroid of the second bounding box;
determine a first unit vector for the feature of interest based on a first pixel location of the first centroid;
determine a second unit vector for the feature of interest based on a second pixel location of the second centroid;
calculate a position of intersection between a first line that has the first unit vector and a second line that has the second unit vector;
calculate a relative location of the feature of interest to the vehicle based on the position of intersection, wherein the first and second images represent a first pair of plural images and the relative location of the feature of interest is a first relative location;
analyze a second pair of the plural images to identify the feature of interest depicted in each image of the second pair and calculate a second relative location of the feature of interest, based on the position of intersection;
aggregate at least the first relative location and the second relative location to determine a final relative location of the feature of interest relative to the physical environment;
weight the first relative location greater than the second relative location based on a first time delay between respective times that the first image and the second image in the first pair are generated by the imaging device being greater than a second time delay between times that the images in the second pair are generated by the imaging device; and determine an absolute location of the feature of interest, within a physical environment, based on the final relative location and a reference location of the vehicle at either a first time at which the imaging device generated a first portion of the optical data used to generate the first image or a second time at which the imaging device generated a second portion of the optical data used to generate the second image.

16. The system of claim 15, wherein the controller is further configured to:

compare the absolute location of the feature of interest to an archival location of the feature of interest stored in a map file; and verify the archival location in the map file in response to the absolute location of the feature of interest being within a designated proximity of the archival location.

17. The system of claim 16, wherein, responsive to the absolute location of the feature of interest being outside of the designated proximity of the archival location, the controller is configured to generate a control signal to one or more of notify an operator of a detected inconsistency or update the archival location of the feature of interest in the map file.

18. The system of claim 15, wherein the controller is configured to determine the reference location of the vehicle based on location data generated by a location determining device disposed onboard the vehicle.

* * * * *